United States Patent [19]

Jones

[11] 4,351,724

[45] Sep. 28, 1982

[54] FILTER ASSEMBLY HAVING SIDE-SUPPORTED SLIDABLE KING AND QUEEN ENDS

[75] Inventor: Paul F. Jones, Newcastle-Under-Lyme, England

[73] Assignee: Johnson-Progress, Limited, Stoke-on-Trent, England

[21] Appl. No.: 118,386

[22] Filed: Feb. 5, 1980

[30] Foreign Application Priority Data

Feb. 7, 1979 [GB] United Kingdom ............... 7904285

[51] Int. Cl.³ ............................................. B01D 25/34
[52] U.S. Cl. ................................... 210/230; 100/199
[58] Field of Search ............. 100/193, 196, 197, 198, 100/199; 210/224, 225, 226, 227, 228, 229, 230

[56] References Cited

U.S. PATENT DOCUMENTS 3,330,414  7/1967  Mecky ................................. 210/227
3,623,424 11/1971  Busse et al. ..................... 210/224 X
4,083,298  4/1978  Schotten ........................ 210/224 X
4,105,560  8/1978  Fismer ................................ 210/230
4,196,084  4/1980  Schotten ............................ 210/224

*Primary Examiner*—Charles N. Hart
*Assistant Examiner*—David R. Sadowski
*Attorney, Agent, or Firm*—Howard L. Rose

[57] ABSTRACT

A plate-type filter press has sidebars carried on fixed frames, and the filter press plates, the queen end and the king end are all supported on the sidebars by means of pins projecting laterally from the plates and the king and queen ends and resting on the bars. The plates and the queen end are able to slide along the bars on their pins, and even the king end is allowed a limited amount of float between stops on the bars. The press is opened and closed by means of double-acting hydraulic piston-and-cylinder units which are mounted on the king end and are coupled to the queen end by longitudinally extending tie rods so as to close the press by pulling the queen end towards the king end.

5 Claims, 3 Drawing Figures

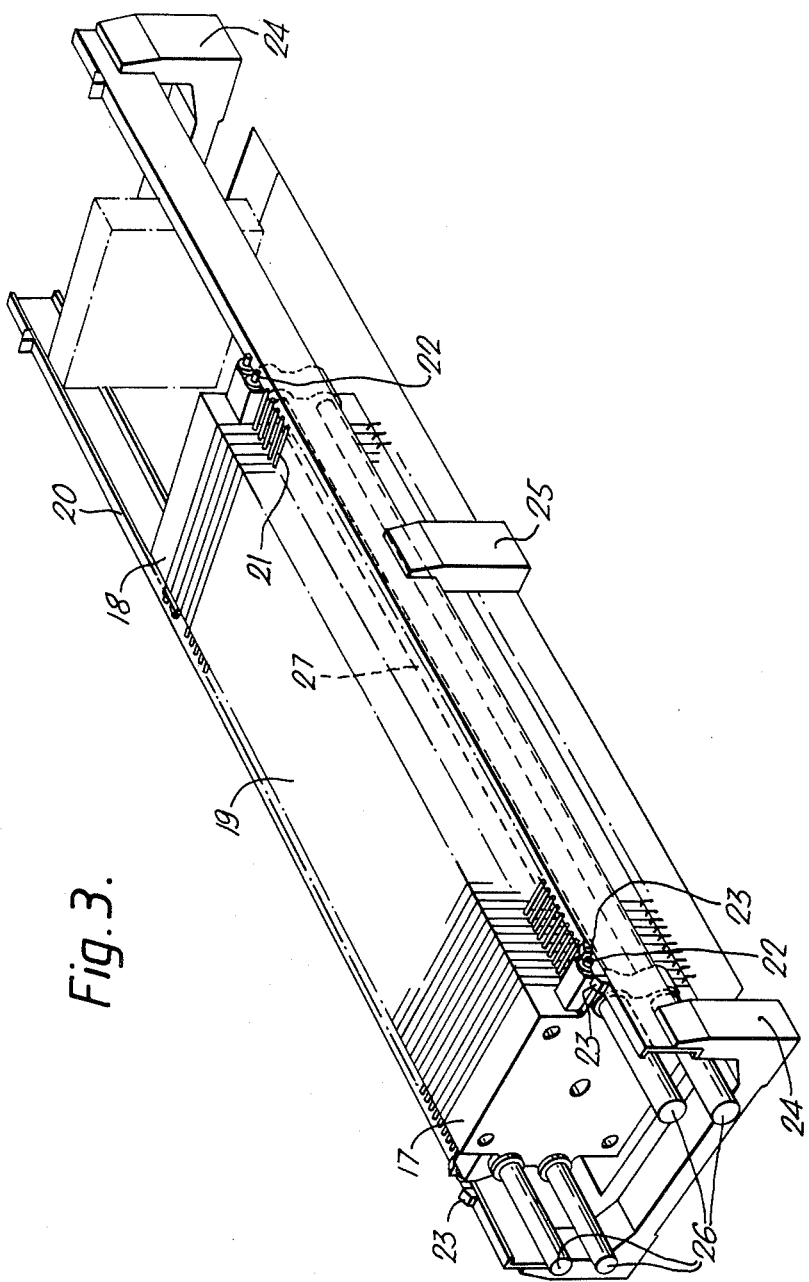

FILTER ASSEMBLY HAVING SIDE-SUPPORTED SLIDABLE KING AND QUEEN ENDS

This invention relates to plate type filter presses. More particularly, it is concerned with the press frame assembly and the manner of mounting of the filter plates.

Figure 1:
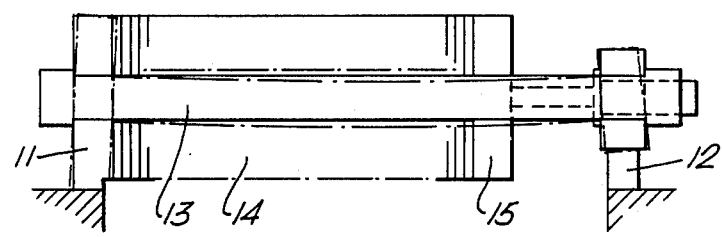

In conventional sidebar filter presses employing "push to close" hydraulic systems the main press frame ends are normally fixed to the longitudinal member on which the filter plates are suspended. FIG. 1 shows fixed press ends 11, 12 secured to sidebars 13 on which the pack of filter plates 14 and the moving or queen end 15 of the plate pack are suspended.

In theory, such arrangements, when the main cylinder closing forces are generated, should produce equal but opposite tension forces in the sidebars and again in theory, the tension force should be equal in each bar. However, for this to be true perfect alignment must exist and, in practice, perfect alignment cannot exist because the effective axis of thrust can change from cycle to cycle due to changing conditions within the filter press and external to the filter press. For example, internal pressure may become unbalanced due to a partial or full blockage in the feed passages to the filter chambers. Filter cloths may not be cleaned sufficiently resulting in a wedge-shaped plate pack. Sidebars can deflect vertically and can disturb a central thrust axis, as illustrated in broken lines in FIGS. 1 and 2. Also, structural supports may deflect unevenly.

These changing conditions produce undesirable movement in the press framework, create complex stress patterns in the sidebars at the end fixing points and transmit substantial forces into the press supporting structure. Such problems become more serious with increasing operational working pressures and increasing press length.

According to the present invention, a filter press is provided in which all of the members of the filter press plate pack including the king and queen ends and the filter plates between are supported on fixed sidebars in a manner permitting at least a limited amount of "float" in the longitudinal direction of the press even to the king end, and opening and closing effort is applied by one or more fluid-operated piston-and-cylinder units mounted on the king end to float therewith and coupled by one or more longitudinal tie rods to the queen end so as to close the press by pulling the queen end toward the king end.

A principal purpose of this fully floating sidebar press is to eliminate, as far as is possible, the problems previously explained that occur in conventional sidebar presses, and to facilitate the use of higher working pressures and longer presses.

The fully floating principle replaces the "push to close" system with a "pull to close" system. Pull to close presses are not new but previously the plates in such presses have been underslung from overhead rails. This design has several disadvantages, amongst which are that the overhead suspension arrangements occupy space and make the press less accessible so that the changing of plates and filter cloths takes longer, and the suspension is particularly vulnerable in cases where the medium to be filtered gives rise to corrosive fumes.

One arrangement of filter press in accordance with the invention will now be described, by way of example, with reference to the accompanying drawings.

Figure 2:
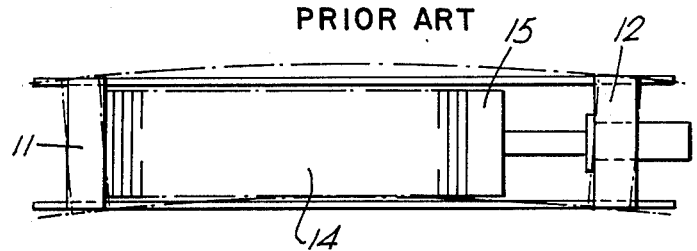

In the drawings:

FIGS. 1 and 2, already referred to, illustrate types of distortion in conventional "push-to-close" plate-type filter presses, and FIG. 3 is a pictorial view of a press embodying the invention.

In FIG. 3, the main press components, i.e. king end 17, queen end 18 and filter plate pack 19, are freely supported on sidebars 20, one at each side of the press, by means of lateral support pins 21, 22 that rest on the sidebars. The sidebars 20 are carried by fixed end base frames 24 and intermediate supports 25. Opening and closing of the press is performed on a pull-to-close basis by means of four double-acting hydraulic piston-and-cylinder units 26 having their cylinders mounted on the king end 17 and having piston rods passing through the king end and coupled to tie rods 27 extending longitudinally of the press alongside the filter plate pack 19, which tie rods are connected to the queen end 18.

The king and queen ends and the filter plates are not fixed in any way to the sidebars. The king end 17 is free to "float" between pairs of stops 23 on the sidebars. This means that operational misalignments which will always occur are accommodated within the press pack itself and no substantial forces are transmitted into the sidebars or to the press supporting structure.

Axial tension forces are not present in the sidebars 20.

The sidebars carry vertical loadings only, plus relatively small dynamic and frictional forces. Therefore, the sidebars 20, the end base frames 24 and intermediate supports 25, and other supporting structural members, can be designed according to normal structural practice uncomplicated by indeterminate machine forces. The sidebars 20, their end base frames 24 and intermediate supports 25, and other supporting structural members, can thus be lighter in construction than those required in conventional sidebar presses since they do not have to sustain longitudinal press pack forces. Hence an overall economic design is possible.

The design enables the filter press to be extended more easily than conventional sidebar presses. It can also be readily seen that the design affords clear access from above the press for easy filter plate changing and cloth washing operations.

I claim:

1. A filter press comprising a pair of fixed side bars extending horizontally one along each side of the press, a stack of filter plates disposed between the side bars and all supported on the side bars for individual sliding movement therealong by means of pins projecting laterally from the sides of the plates and resting on the side bars, a king end and a queen end at opposite ends of said stack of filter plates and each likewise supported on the side bars for individual sliding movement therealong by means of pins projecting laterally from the sides of said king end and said queen end, and fluid-operated piston-and-cylinder units mounted on said king end to float therewith on the said side bars, said piston-and-cylinder units having their axes parallel to said side bars and being disposed at opposite sides of said king end adjacent interiorly of said side bars and longitudinal tie rods coupling said queen end to said piston-and-cylinder units thereby to close the press by pulling said queen end toward said king end, said tie rods being disposed at opposite sides of said stack of filter plates and lying between said stack and said side bars.

2. A filter press according to claim 1, wherein the sidebars are carried on fixed end frames and intermediate supports.

3. A filter press according to claim 1, wherein the king end is free to float on the sidebars between pairs of stops on the bars.

4. A filter press according to claim 3, wherein four double-acting hydraulic piston-and-cylinder units are provided for opening and closing the press with their cylinders mounted on the king end and having piston rods connected to the queen end by said longitudinal rods.

5. A filter press according to claim 1, wherein four double-acting hydraulic piston-and-cylinder units are provided for opening and closing the press with their cylinders mounted on the king end and having piston rods connected to the queen end by said longitudinal rods.

* * * * *